(12) United States Patent
Carter (10) Patent No.: US 12,465,755 B2
(45) Date of Patent: Nov. 11, 2025

(54) NEURAL STIMULATOR WITH FLYING LEAD ELECTRODE

(71) Applicant: Cochlear Limited, Macquarie University (AU)

(72) Inventor: Paul Michael Carter, Galson (AU)

(73) Assignee: Cochlear Limited, Macquarie University (AU)

( * ) Notice: Subject to any disclaimer, the term of this patent is extended or adjusted under 35 U.S.C. 154(b) by 0 days.

(21) Appl. No.: 18/475,575

(22) Filed: Sep. 27, 2023

(65) Prior Publication Data

US 2024/0017060 A1    Jan. 18, 2024

Related U.S. Application Data

(63) Continuation of application No. 16/754,291, filed as application No. PCT/IB2018/057700 on Oct. 3, 2018, now abandoned.

(60) Provisional application No. 62/570,595, filed on Oct. 10, 2017.

(51) Int. Cl.
*A61N 1/05* (2006.01)
*A61N 1/375* (2006.01)

(52) U.S. Cl.
CPC ......... *A61N 1/0541* (2013.01); *A61N 1/0529* (2013.01); *A61N 1/0551* (2013.01); *A61N 1/0558* (2013.01); *A61N 1/37518* (2017.08)

(58) Field of Classification Search
None
See application file for complete search history.

(56) References Cited

U.S. PATENT DOCUMENTS

| | | | |
|---|---|---|---|
| 5,324,316 A * | 6/1994 | Schulman | A61N 1/372 607/72 |
| 5,476,485 A | 12/1995 | Weinberg et al. | |
| 6,208,882 B1 | 3/2001 | Lenarz | |
| 6,473,653 B1 | 10/2002 | Schallhorn et al. | |
| 7,239,918 B2 | 7/2007 | Strother et al. | |
| 7,305,268 B2 | 12/2007 | Gliner et al. | |
| 2005/0131506 A1 | 6/2005 | Rezai et al. | |
| 2005/0165465 A1* | 7/2005 | Pianca | H01R 43/16 607/116 |
| 2005/0267549 A1 | 12/2005 | Santina et al. | |
| 2008/0312716 A1 | 12/2008 | Russell | |
| 2009/0143848 A1* | 6/2009 | Greenberg | A61N 1/0541 607/137 |
| 2009/0248111 A1* | 10/2009 | Pianca | A61N 1/05 607/116 |
| 2009/0299447 A1 | 12/2009 | Jensen et al. | |

(Continued)

OTHER PUBLICATIONS

International Search Report and Written Opinion received in related International Application No. PCT/IB2018/057700, dated Mar. 25, 2019 (15 pages).

*Primary Examiner* — Michael W Kahelin
(74) *Attorney, Agent, or Firm* — Edell, Shapiro & Finnan, LLC (57) ABSTRACT

A neural stimulator, suitable for implanting in a recipient, and having a flying lead with a configurable electrode. A benefit is an intra-operative ability to adjust the connection between the lead and an anatomically correct electrode, which obviates the need to manufacture multiple different configurations of implant to suit different placements of flying lead electrode.

17 Claims, 5 Drawing Sheets

(56) References Cited

U.S. PATENT DOCUMENTS

| | | | |
|---|---|---|---|
| 2010/0036445 A1* | 2/2010 | Sakai | A61N 1/0496 607/116 |
| 2011/0178575 A1 | 7/2011 | Cryer et al. | |
| 2011/0264183 A1 | 10/2011 | Gibson | |
| 2012/0157815 A1 | 6/2012 | Pau | |
| 2013/0041428 A1 | 2/2013 | Leigh | |
| 2013/0178910 A1 | 7/2013 | Azamian et al. | |
| 2013/0226254 A1 | 8/2013 | Walling et al. | |
| 2013/0238066 A1 | 9/2013 | Boggs et al. | |
| 2015/0087892 A1 | 3/2015 | Tourrel et al. | |
| 2015/0202438 A1 | 7/2015 | Meskens | |
| 2016/0158558 A1 | 6/2016 | Shanahan et al. | |
| 2016/0243336 A1 | 8/2016 | Kratoska et al. | |
| 2017/0100580 A1* | 4/2017 | Olson | A61N 1/0551 |
| 2018/0304069 A1* | 10/2018 | Koka | A61N 1/36039 |
| 2020/0324108 A1* | 10/2020 | Carter | A61N 1/0551 |

\* cited by examiner

NEURAL STIMULATOR WITH FLYING LEAD ELECTRODE

TECHNICAL FIELD

The technology described herein generally relates to electrodes used in medical devices, and more particularly relates to a versatile electrode for neural stimulators.

BACKGROUND

Medical devices having one or more implantable components, generally referred to herein as implantable medical devices, have provided a wide range of therapeutic benefits to recipients over recent decades. In particular, partially or fully-implantable medical devices such as hearing prostheses (e.g., bone conduction devices, mechanical stimulators, cochlear implants, and the like), implantable pacemakers, defibrillators, functional electrical stimulation devices, and other implantable devices, have been successful in performing lifesaving and/or lifestyle enhancement functions for a number of years.

Consequently, the types of implantable medical devices and the ranges of functions performed by them have increased over time. Many implantable medical devices now include one or more instruments, apparatus, sensors, processors, controllers or other functional components of a mechanical or electrical nature that are permanently or temporarily implanted in a recipient. These functional components perform diagnosis, prevention, monitoring, treatment or management of a disease or injury or its symptoms, or are employed to investigate, replace or modify a portion of the recipient's anatomy or a physiological process. Many functional components utilize power and/or data received from external components that are part of, or operate in conjunction with, the implantable medical device.

The number of disparate roles played by such devices means that it can now be envisaged that a given implantable device could play more than one role, if it could be adapted to do so during or after implant.

The discussion of the background herein is included to explain the context of the technology. This is not to be taken as an admission that any of the material referred to was published, known, or part of the common general knowledge at the priority date of any of the claims found appended hereto.

Throughout the description and claims of the application the word "comprise" and variations thereof, such as "comprising" and "comprises", is not intended to exclude other additives, components, integers or steps.

SUMMARY

The instant disclosure addresses modifying an implantable lead, including a flying lead electrode, with an attachable portion to suit the intended application.

The attachable portion can be attached to the distal tip of the lead, or attached at a suitable position along the length of the lead.

The disclosure further comprises a neural stimulator that includes an electrode lead configured to accept an attachment that is designed to secure the lead at a desired location on a recipient's anatomy.

The disclosure further includes a flying lead electrode, comprising a lead for passing electric current to a location on or within a person's anatomy, the lead having a tip that can accept an attachment of differing shapes and sizes, according to application.

In other respects, the present disclosure provides for a method of fitting a neural implant, which includes: implanting an electrode contact and a neurostimulator (in either order) within the recipient, such that the electrode contact can be connected to an attachment, and electrically connecting the neurostimulator to the electrode after the neurostimulator is implanted in the recipient so that the neurostimulator is configured to deliver current through the electrode to the recipient.

The flying lead electrode can be supplied within a kit, such as a kit having a prosthetic implant, the electrode, and a selection of attachments of different shapes that can be attached to the electrode such as at its tip or along its length.

The disclosure further includes a medical device, supplied by itself or within a kit having instructions for use by a surgeon. The medical device includes an implantable neural stimulator, and an electrode that can be electrically connected to the neural stimulator during surgical implantation.

BRIEF DESCRIPTION OF THE DRAWINGS

Like reference symbols in the various drawings indicate like elements.

DETAILED DESCRIPTION

A medical device system comprising an implantable neural stimulator and an attachment electrode is disclosed herein. The attachment electrode facilitates customization of the neural stimulator. For example, the attachment can be an anatomically configured electrode that is configured to be implanted at a target anatomical site for neural stimulation and/or measurement. In some instances, the implantable neural stimulator has an electrode lead that is configured to accept the attachment and the attachment is adapted to secure the lead to a location on a recipient's anatomy.

By "anatomically configured" is meant that a device can be implanted in and retained by a recipient. For example, U.S. application Ser. No. 13/375,141, incorporated by reference herein, describes a vestibular electrode array that is anatomically configured because it is "dimensioned such that residual vestibular function of the semicircular canal in which the at least one electrode array is implanted is retained." That electrode array is about "2-3 mm long and has a diameter of less than 150 microns".

In general, the attachment is configured to be joined to an electrode lead. The attachment and lead can be joined by crimping, screwing, or gluing for example. Some examples of neural stimulators that can use this technology can include an auditory prosthesis, a deep brain stimulator, a spinal stimulator, a vestibular stimulator, a transcranial stimulator, and a pacemaker.

The neural stimulator can comprise a flying lead electrode that is configured to receive the attachment. A flying lead electrode comprises a conductor lead for passing electric current to or from a location on a person's anatomy. The attachment electrode can connect to a site along the length of the flying lead or at the tip. In some embodiments, the flying lead can include a tip electrode or tip contact that is configured to accept the attachment. For example, the electrode lead can have a first contact surface, and the attachment can have a second contact surface that is configured to form an electrical connection with the first contact surface of the electrode lead. In this situation, the attachment electrode typically has a third contact surface that is configured to form an electrical connection between the attachment and tissue of a recipient of the neural stimulator. Exemplary such contact surfaces are shown with respect to FIG. 4.

The attachment and electrode lead have electrically conductive parts that come into contact. They can be referred to as first and second contact surfaces. The attachment also has an additional conductive surface to deliver or measure current and/or voltage.

That can be referred to as the third surface. The electrode lead of the neural stimulator usually comprises an electrical conductor embedded in a non-conductive carrier member. The first contact surface is electrically connected to the electrical conductor and at least part of the first contact surface is exposed (i.e., not covered by the non-conductive carrier member).

The electrode arrays comprise: (i) wires, (ii) contacts (or electrodes), and (iii) a silicone carrier that holds everything together. The electrode arrays are made by positioning the electrodes in a die, electrically connecting the wires to each electrode/contact, filling the die with silicone, and then removing the layer of silicone covering the electrodes/contacts.

The attachment electrode can be anatomically configured to suit a target anatomical site within a recipient. For example, the size, shape, structural characteristics and/or electrical properties of the electrode can be configured for the site of implantation. The attachment electrode can also be configured to be implanted at a target anatomical site before electrical connection to the neural stimulator. The implantable neural stimulator can be configured to use the electrode to deliver electrical stimulation to the target anatomical site, or to measure electrical properties of the recipient (such as neural response potentials) at the target site.

As a further example, when the flying lead electrode is used for purposes other than placement in the temporalis muscle it is generally advantageous to change the physical form of the electrode to suit its intended purpose. In the situations described elsewhere herein, the best physical form may be as follows.

Stapedius muscle: a crimp-on sleeve with a central portion designed to pierce the muscle and locate within the muscle body (for examples, see U.S. Pat. App. Pub. No. 2012-0157815 A1 and U.S. Pat. No. 6,208,882.)

Apex placement may require a way to attach the device to the cochlear apex such as with screws, pins, or mesh, to encourage fibrous tissue growth, or one or more plates to allow fixative agents such as fibrin glue, or bone cement.

Auditory potential measurement may require a large surface area to reduce the impedance between the electrode and the surrounding tissue, and thereby reduce the recorded noise on the sensed signal.

The implantable neural stimulator typically comprises an electrode or an electrode array that is configured to deliver electrical stimulation to a recipient of the medical device. It can also include a separate flying lead electrode (such as return or ground electrode). In this situation, the anatomically configured electrode can be configured to connect to the electrode array or the flying lead electrode.

The implantable neural stimulator and one or more attachment electrodes can be supplied, unattached, in a surgical kit. This allows a surgeon to connect a desired attachment electrode to the neural stimulator before or during surgery. The surgical kit can contain a plurality of anatomically configured electrodes that are configured for placement at different anatomical locations. It can also contain tools, guides and/or templates for the anticipated surgical procedure (such as any tools that are needed to connect the attachment electrode to the neural stimulator). The components of the surgical kit are typically packaged in closed sterile packaging, with the implantable neural stimulator and anatomically configured electrode(s) physically separated.

The implantable neural stimulator can be implanted in a recipient by securing the attachment electrode to a part of the recipient's anatomy, and subsequently electrically connecting the attachment electrode to the implantable stimulator unit. This allows the neural stimulator to deliver electrical stimulation to the recipient and/or measure neural potential via the electrode.

In at least some embodiments, the neural stimulator can be configured to operate in the absence of an attachment electrode (e.g., the attachment electrode can be used to repurpose the neural stimulator for another application). And the surgeon may have to modify the neural stimulator in order to repurpose it. For example, the surgeon may need to remove an insulating layer from a lead of the implantable stimulator to expose an electrical contact and connect the attachment electrode to the exposed electrical contact to form an electrical connection. The implantable stimulator can be implanted in the recipient before the electrode is electrically connected, or afterwards.

The disclosure includes an implantable lead, including a flying lead electrode modified to have an attachable portion configured to suit the intended application. The flying lead electrode may be used with a variety of neural stimulators and is illustrated herein with respect to auditory prostheses.

The disclosure further includes a neural stimulator having an electrode lead configured to accept an attachment, such that the attachment is adapted to secure the lead to a location on a recipient's anatomy. The location can be at a position selected from: the recipient's skull proximal to the temporalis muscle; and the recipient's ear at the stapedius muscle.

The attachment can be a crimp-on sleeve having a central portion designed to pierce the recipient's stapedius muscle, and can further have a shape such as a rod, a ball, a cube, or a blade.

The attachment can have sufficient surface area to reduce impedance between the tip of the flying lead electrode and the surrounding tissue.

The neural stimulator can be an auditory prosthesis that includes an electrode array positioned at the apex of the recipient's cochlea, and can further include an electrode configured to sense electrical potentials from auditory stimulation.

The disclosure further includes a method of fitting a neural implant, comprising: implanting an electrode contact into a recipient, implanting a neurostimulator, such as an audioprosthesis, within the recipient, electrically connecting the neurostimulator to the electrode after the neurostimulator is implanted in the recipient so that the neurostimulator is configured to deliver current through the electrode to the recipient.

In such a method, the electrode can be connected to the neural stimulator by an attachment selected from a plurality of attachments of differing shapes, including but not limited to: a rod, a ball, a cube, and a blade.

The disclosure further includes a kit, comprising: a prosthetic implant such as an audioprosthesis; a flying lead electrode having a tip configured to accept an attachment selected from a plurality of attachments; and a plurality of attachments of differing shapes, including but not limited to: a rod, a ball, a cube, and a blade.

Figure 1:
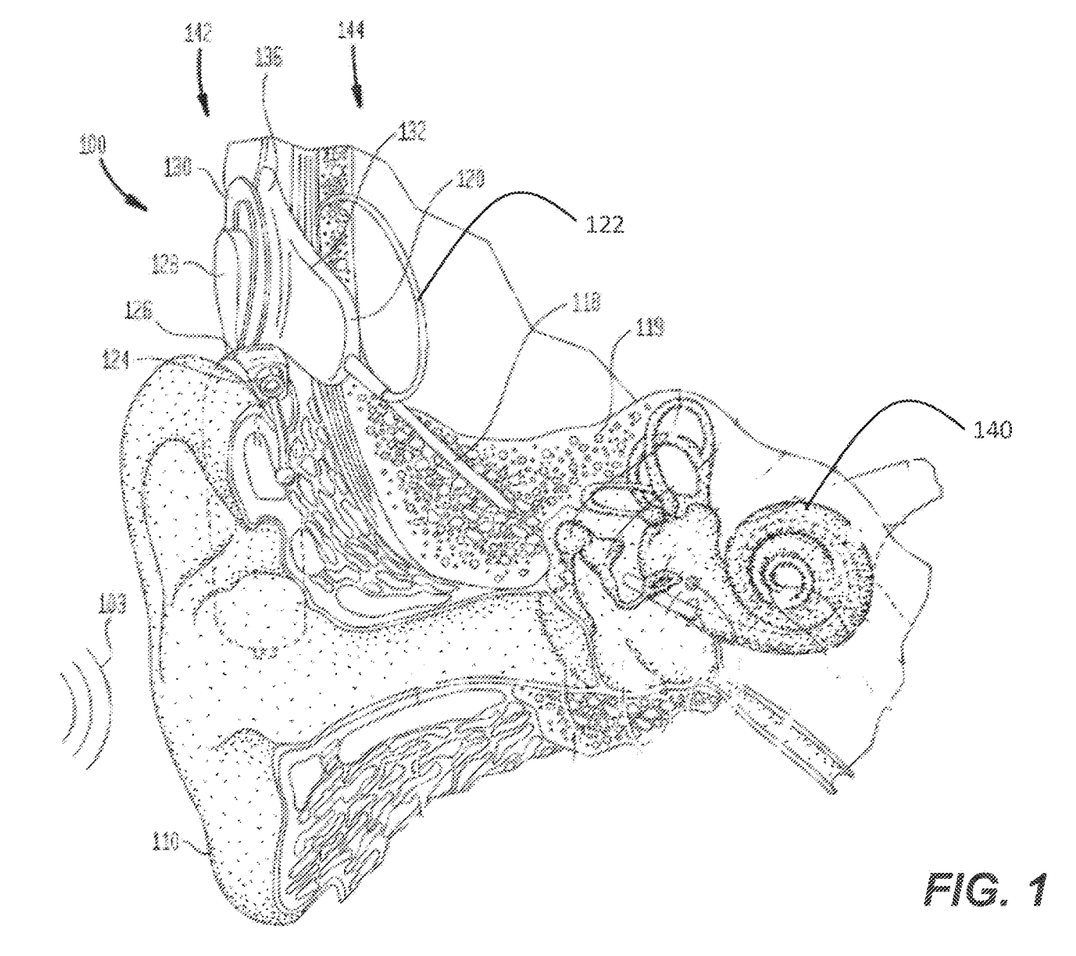
FIG. 1 shows a schematic of a cochlear implant having a flying lead electrode.

FIG. 1 depicts an exemplary cochlear implant system 100 that comprises an internal component 144 and an external component 142 having a behind-the-ear (BTE) sound processor 124 that can detect sounds 103, and a separate coil 128/130 that is connected to the BTE processor by a cable (not shown in the drawing).

Internal component 144 typically has an internal (implanted) receiver/transceiver unit 132, a stimulator unit 120, an extra-cochlear electrode (represented by flying lead 122), and an elongate stimulating assembly 118. Elongate stimulating assembly 118 has a proximal end connected to stimulator unit 120, and a distal end having an intra-cochlea electrode array implanted in cochlea 140. Stimulating assembly 118 extends from stimulator unit 120 to cochlea 140 through mastoid bone 119.

Flying lead 122 exits the receiver/stimulator at the same location as the stimulating assembly 118. Flying lead 122 has an electrode disposed at its distal end (not shown in FIG. 1), which in the embodiment shown is embedded in the recipient's muscle tissue adjacent the coil 136.

The internal receiver/transceiver unit 132 permits the cochlear implant system 100 to receive and/or transmit signals to a portion 126 of the external component and includes an internal coil 136, and preferably, a magnet (not shown) fixed relative to the internal coil 136. Internal coil 136 is typically a wire antenna coil. Internal receiver unit 132 and stimulator unit 120 are hermetically sealed within a biocompatible housing (not shown), and are sometimes collectively referred to as a stimulator/receiver unit. In use, implantable receiver unit 132 may be positioned in a recess of the temporal bone adjacent auricle 110 of the recipient.

Various types of energy transfer, such as infrared (IR), electromagnetic, capacitive and inductive transfer, may be used to transfer the power and/or data from external device to cochlear implant. In certain instances of system 100, external coil 130 transmits electrical signals (e.g., power and stimulation data) to internal coil 136 via a radio frequency (RF) link.

In FIG. 1, the sound processor is shown mounted close to the recipient's ear but the technology is not limited to such positioning, and in other embodiments, an off-the-ear (or "button") sound processor can be used. In systems that use a "button" processor, the radiofrequency coil and the external magnet are integrated into a single package. In such embodiments there is a need for a flying lead electrode of flexible length and positioning, due to the variation in position of the processor.

Many neural stimulators, such as the cochlear implant system 100 shown in FIG. 1, are equipped with more than one electrical lead, thereby permitting different electrical functions to be performed at different locations within a recipient's anatomy. Some implantable neural stimulators have electrodes located at the end of flying leads, which generally are leads that have some flexibility in their surgical placement and manner of connection. For example, the cochlear implant system 100 shown in FIG. 1 has a flying lead electrode which is usually placed in the temporalis muscle of the recipient. This electrode is present in addition to an electrode array that is positioned in the recipient's cochlea. There may also be other "extra-cochlear" electrodes, such as a plate electrode on the receiver/stimulator housing. The "extra-cochlear" electrodes provide a low impedance return for stimulation current and are typically used in conjunction with intra-cochlear electrodes to evoke hearing perception. In other embodiments, the flying lead can be used as an alternative to other extracochlear electrodes (such as a plate electrode on the body of the implant). This can sometimes avoid unwanted stimulation of the recipient's facial nerve by providing an alternative path for current once it leaves the cochlea. The design of the electrode itself, at the end of the insulated flying lead, is optimized for placement in the temporalis muscle of the recipient. In some implants, the flying lead electrode is in the form of a small titanium rod, whereas in other implants it is in the form of a small platinum ball.

In each instance, however, the electrode is packaged as part of the neural stimulator and cannot be modified prior to implantation of the device, which means that it can only perform a single function, or may even be redundant.

A flying lead electrode can be placed in many different parts of a recipient's anatomy, and used to provide stimulation or to sense electric potentials. Examples of placement include: in the temporalis muscle; in the stapedius muscle to sense the stapedius reflex; at the apex of the cochlear to stimulate more apical nerve fibers than are normally accessible through a conventional intracochlear electrode; distally from the receiver/stimulator plate electrode of an audioprosthesis, in order to sense electric potentials arising from auditory stimulation (e.g., electrical auditory brainstem responses (EABRs), and cortical potentials); and in or near the vestibular organ or nerve to stimulate or sense signals from the vestibular system.

It is generally advantageous to modify the physical form of the electrode to suit its intended purpose and placement. For example, in the foregoing cases the best physical form may change for the intended application. When the flying lead electrode is placed in the temporalis muscle, it can take the form of a ball or cylinder. When embedded in the stapedius muscle, the electrode can comprise a crimp-on sleeve with an anatomically configured central portion designed to pierce the muscle and position the electrode within the muscle body (for examples, see U.S. Pat. App. Pub. No. 2012-0157815 A1 and U.S. Pat. No. 6,208,882). When positioned in the apex of cochlea, the electrode can benefit from being attached to the cochlear apex with fixation devices such as screws, pins, or mesh to encourage fibrous tissue growth, in conjunction with one or more plates to allow fixative agents such as fibrin glue, bone cement to ensure that the electrode does not move. A suitable electrode for insertion into a semicircular canal of the vestibular system is described in U.S. Pat. No. 9,089,692, which is incorporated herein by reference.

In the situation where the attachment electrode is used for auditory potential measurement, the electrode can sometimes benefit from a large surface area to reduce the impedance between the electrode and the surrounding tissue and therefore reduce the recorded noise on the sensed signal. For example, the attachment electrode can be secured to the promontory, round window or adjacent a cochleostomy for measuring Electrocochleography (ECOG) responses, such as the Cochlear Microphonic and Summating Potential.

The foregoing examples can all benefit from adaptation of the flying lead electrode to a different physical form. To achieve this, according to the technology herein, different physical attachments, such as electrode terminations, can be designed, made and attached to an implantable lead to repurpose the lead for another function. The attachments can be configured to secure the lead to a part of the recipient's anatomy, alter characteristic of the electrode/tissue interface, or otherwise repurpose the lead electrode for another application.

A principal advantage of such a configuration is that application-specific electrode terminations can be provided to the surgeon unattached to the remainder of the medical device, thereby affording the surgeon a level of choice during the implantation surgery. The surgeon therefore receives an implantable medical device (such as a neural stimulator) in two parts: a standard device, having a lead electrode with a suitable connector, and an electrode that is configured to be attached via the connector, and which is connected to the remainder of the device immediately before or during surgery.

In an alternative embodiment, a default configuration is such that the connector may also be used as a standard electrode, and the lead electrode is designed to function as the mating half of the connector. Therefore, if the surgeon wishes to use the implant in its configuration as supplied, the surgeon needs to make no adaptations, but if the standard configuration is not desired, the electrode attachment can be simply connected.

The lead electrode can be utilized to stimulate and/or record signals from other sites on the recipient's anatomy. For example, the flying lead electrode 122 of cochlear implant system 100, can be repurposed for electrical connection to anatomy in a recipient's head and neck region. Additionally, the flying lead electrode can be used to sink or source current, when stimulating with another electrode. The various functions of the one or more electrodes are typically configurable or programmable within the hardware or firmware of the implant.

In alternate embodiments, a custom electrode is connected (such as by crimping) to the flying lead of the implantable medical device before shipping. For example, a neuro stimulation implant that has been developed for a given purpose can be customized for an intended application by attaching an electrode termination that is anatomically configured for the intended application and uploading appropriate firmware. Alternatively, an implant, such as cochlear implant system 100, can be adapted for additional functionality (such as stapedius reflex measurement or vestibular stimulation). This can be useful for experimental work (such as research or clinical trials) and applications treating small populations of affected individuals.

The different forms for the lead electrode include, but are not limited to: ball, rod, cube, cylinder, cup, blade. Typically a rod, ball or cube shape is used with a reciprocal connector form of the attachment, whereas a blade is more for the electrode function of the attachment.

Typically the electrodes are small and delicate. For example, a ball-shaped electrode can be as small as 0.5 mm in diameter. A cube-shaped electrode can be as small as 1 mm in equivalent diameter. A rod-shaped electrode can be just 3 mm long.

Figure 2:
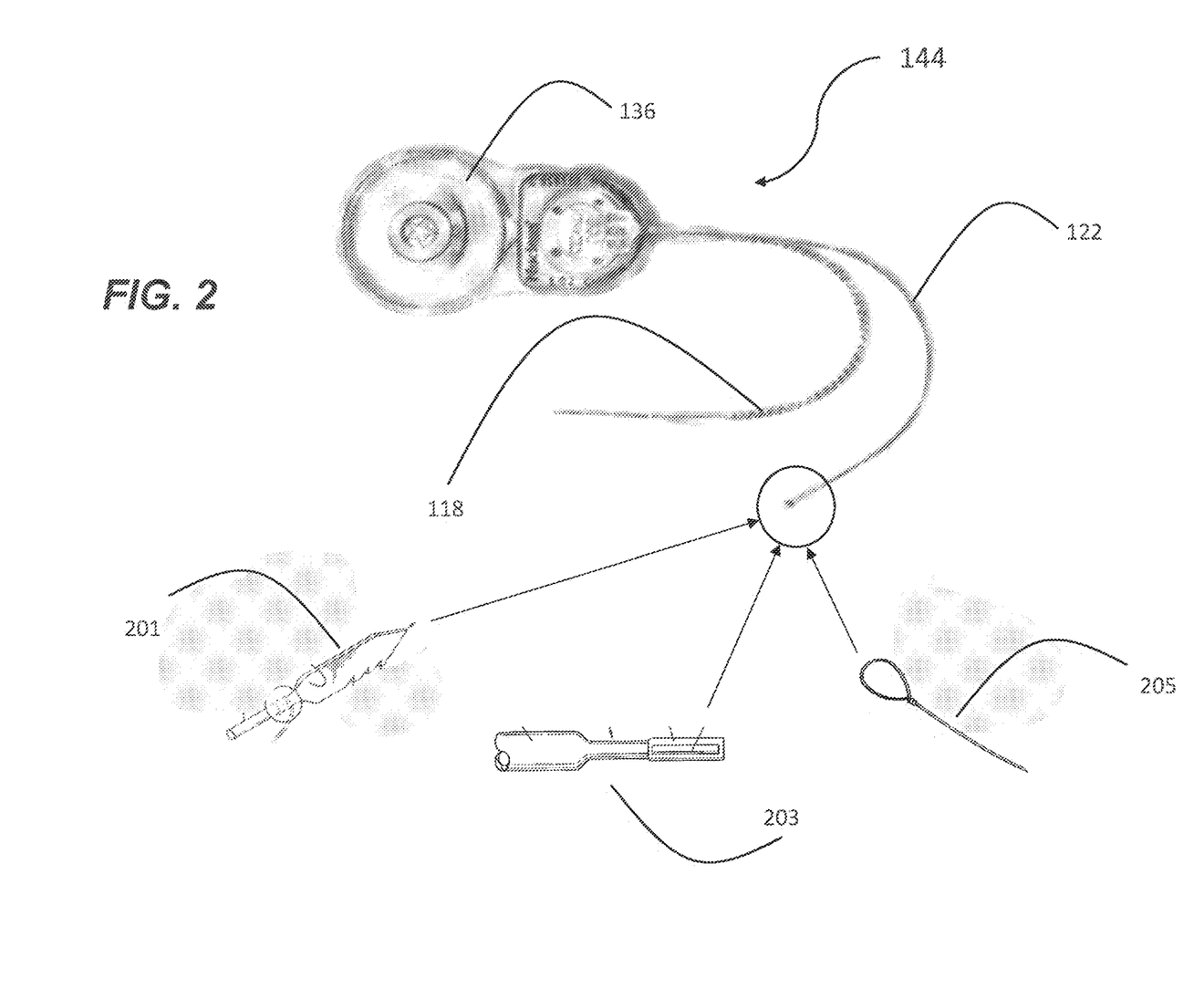
FIG. 2 shows the implantable portion of an audioprosthesis having a flying lead used for an extra cochlea electrode, and a number of optional flying lead electrodes.

FIG. 2 shows several different shape attachments for a flying lead electrode. Flying lead 122 is attached to the internal portion 144 of an audioprosthesis, wherein the internal coil 136 and elongate stimulating assembly 118 are also illustrated. Exemplary alternative flying lead electrodes in the form of a blade 201, cylinder 203, and loop 205 are shown.

The attachment method by which the electrode is attached to the flying lead varies according to the shape, location and function of the electrode. The attachment method preferably fixes the electrode to the existing flying lead electrode, and produces a low impedance connection between the attachment and the existing electrode. For example, attachment can be by methods including but not limited to: crimping, screwing, gluing, or a mechanical coupling such as where the attachment has a reciprocal connector and electrode is insertable into it.

The disclosed technology allows the flying lead electrode of an existing neural stimulation/recording system to be easily and flexibly modified to suit a new intended purpose. This means that existing systems can be repurposed to suit new applications without having to go through the expense of producing entirely new stimulation and recording systems where the lead purpose has already been fixed.

Figure 4:
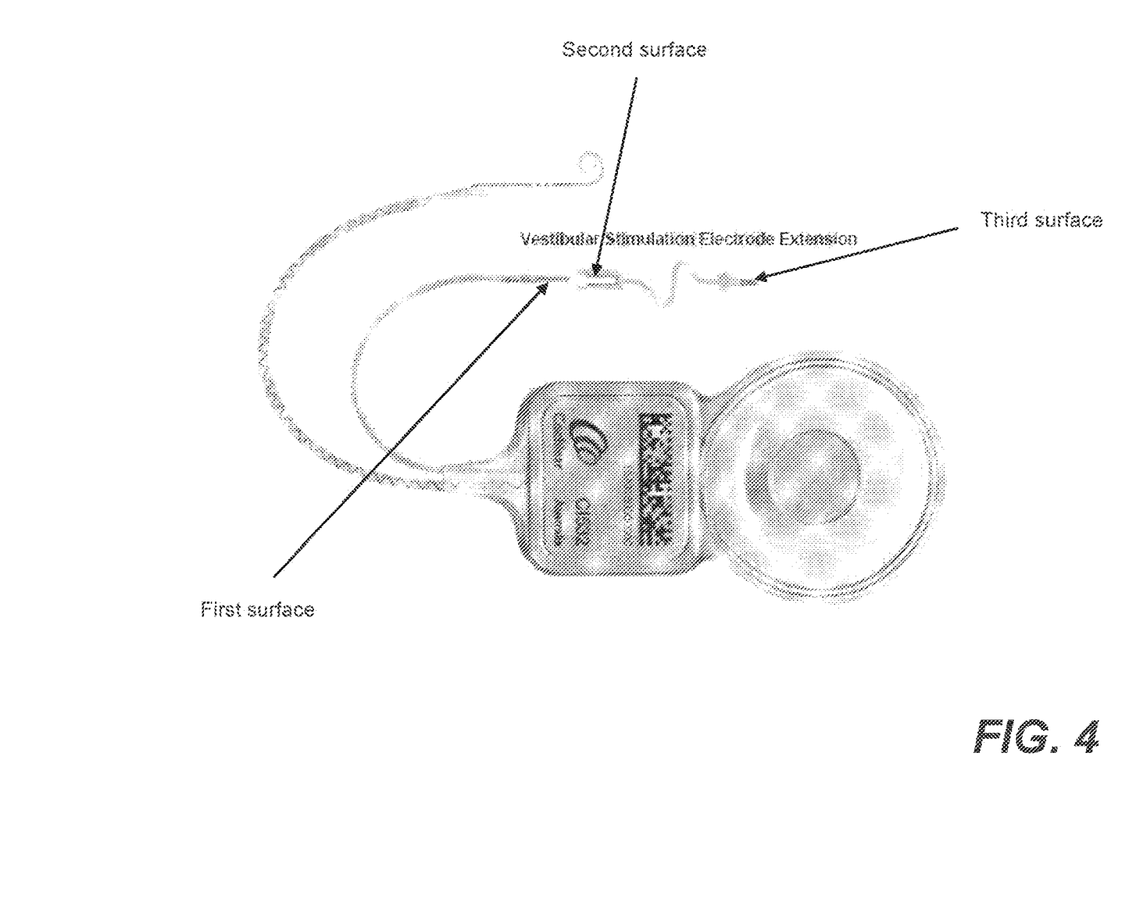
FIG. 4 shows an attachment electrode, for a cochlear implant, that is configured for insertion into the saccule of the vestibular system.

A vestibular attachment electrode is shown in FIG. 4. The illustrated attachment electrode is configured to attach to a cochlear implant to enable stimulation of the vestibular system (most likely in conjunction with stimulation of the cochlea). A connector is disposed at a proximal end of the attachment electrode to facilitate the connection. The connector is configured to electrically connect the attachment electrode to the extra-cochlea electrode of the cochlear implant, shown as a flying lead in FIG. 4.

The depicted attachment electrode has an intra-vestibular section that terminates in a single electrode. The intra-vestibular section is disposed at the distal end of the attachment electrode, opposite the connector. The electrode contact can be positioned at the tip of the intra-vestibular section (as shown in FIG. 4) or midway along the intra-vestibular section (not shown).

The intra-vestibular section is separated from the attachment connector by a short section of compliant lead. The lead comprises an electrical conductor that extends from the connector into the intra-vestibular section to electrically connect the distal electrode contact to the cochlear implant. The conductor and electrode contact are typically made from a biocompatible metal, such as platinum, and embedded in a biocompatible carrier member.

The carrier member is typically made from a suitable polymer, such as medical grade silicone. The lead and intra-vestibular sections of the attachment electrode are separated by a stop that has a greater diameter than the intra-vestibular section. The insertion stop can be formed integrally with the carrier member.

Figure 5:
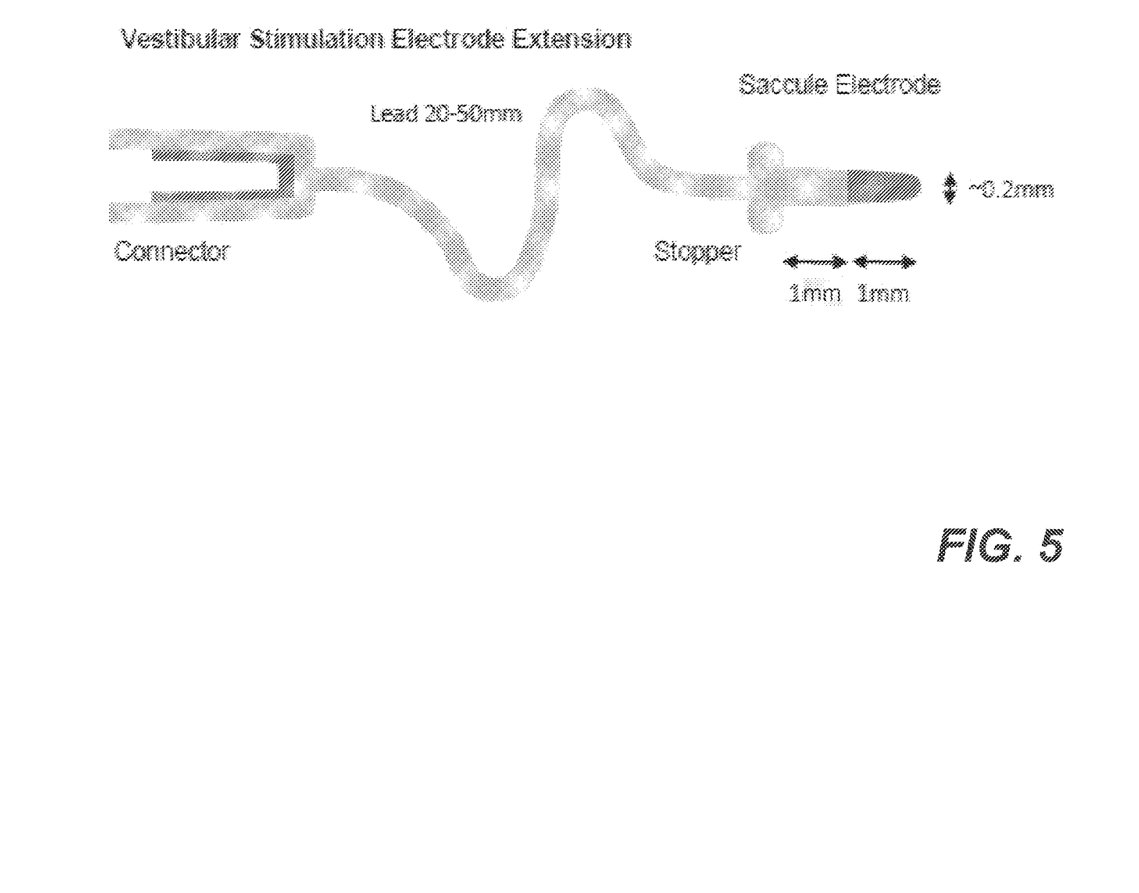
FIG. 5 shows the vestibular attachment electrode of FIG. 4 with exemplary dimensions.

FIG. 5 shows the vestibular attachment electrode of FIG. 4 with some exemplary dimensions for the lead and intra-vestibular sections. The depicted intra-vestibular section is anatomically configured for insertion into the saccule. The length of the intra-vestibular section positions the distal electrode contact adjacent the ampule (the target stimulation site for the depicted attachment electrode). The stop at the base of the intra-vestibular section gives the surgeon an insertion guide and prevents over-insertion. And the small cross-section (diameter) of the intra-vestibular section helps alleviate trauma and preserve residual vestibular function during insertion of the electrode by permitting the use of a commensurately small opening in the vestibular system for insertion of the electrode and promoting compliance of the intra-vestibular section (so that less force is transmitted if contact is made with anatomical structures during insertion).

A surgeon can decide that a lead modification is needed for a particular recipient while the surgery to fit the implant is underway (for example, where the recipient has an anatomical abnormality). The system herein allows the decision about an optimum lead configuration and placement (such as electrode type and placement) to be made during the surgery without having to have alternate implant systems present in the surgery, and without having to carry out revision surgery to implant the flying lead. For example, a surgeon may decide to use an electrode attachment to better secure the flying lead 122 to the temporalis muscle or, for anatomies that may lend themselves more readily to placement of an electrode at or near the apex of the cochlea than others (which may not be apparent until the time of the surgery), the surgeon can repurpose the flying lead 122 during surgery.

Figure 3:
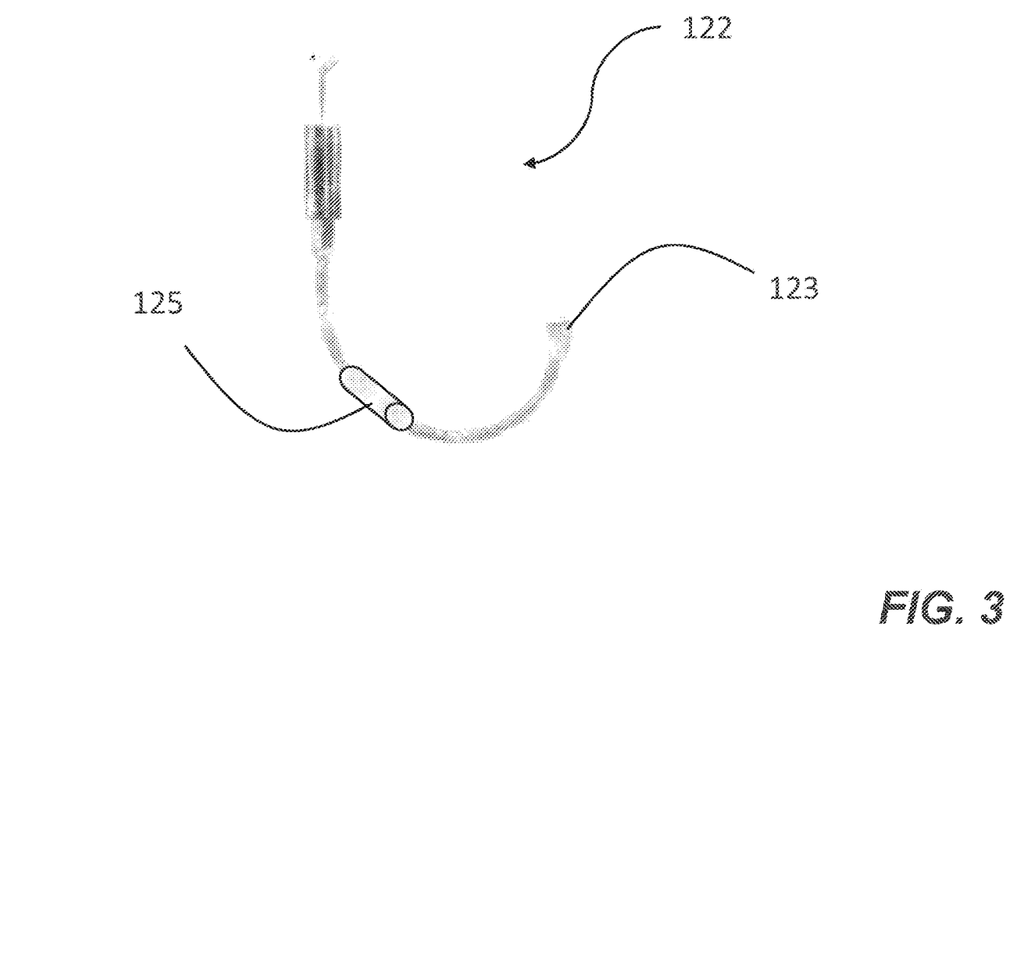
FIG. 3 shows an implantable lead configured to accept an attachment at a position along its length, rather than at its tip. The component of FIG. 3 is part of an acoustic implant, specifically a middle ear actuator at the end of a lead. The actuator is physically coupled to the ossicles—the small bones that make up the middle ear. It uses reciprocating mechanical force to evoke a hearing percept, rather than utilizing electrical stimulation.

There is also the possibility to connect an anatomically correct electrode part-way along an implantable lead. An example is shown in FIG. 3, where the lead 122 for an implantable actuator is shown with a lead electrode 125 positioned along its length, such as midway between the actuator and receiver/stimulator end 123. An anatomically configured electrode can be attached to, such as crimped on to, lead electrode 125. The positioning of lead electrode 125 is variable in that it is not at either end of the flying lead and is therefore somewhere along the middle portion of the lead though not necessarily at its exact midpoint.

In another embodiment, a lead having another tip/electrode is attached via lead electrode 125 to implantable lead 122. For example, the acoustic implant shown in FIG. 3 can be configured to measure neural activity (such as electrical potentials originating within the cochlea or auditory nerve) evoked by the actuator. (Acoustic implants typically drive the bones of the middle ear (ossicles) or the oval window directly.) An attachment that facilitates measurement of neural activity can comprise a measurement contact, configured for placement adjacent the cochlea or nerve, and a length of electrical lead, configured to connect the measurement contact to the lead electrode 122.

Exemplary Neurostimulators

The technology described herein can be adapted to work with any type of hearing device that is surgically implanted. Such devices include audio-prostheses generally, such as acoustic implants and cochlear implants. The devices include those that function via bone conduction, those that work in the middle ear, and various combinations of such hearing device types. The technology herein is also compatible with other hearing devices, such as devices that are worn off the ear but communicate with an implanted portion.

The technology can also be applicable to neural stimulators more generally, such as stimulators used in a neuromodulation therapy, including but not limited to: a pacemaker, a spinal stimulator, a vagus nerve stimulator, a gastric stimulator, an intestinal stimulator, a transcranial stimulator, a peripheral nerve stimulator and an auditory brain implant (ABI) that has a paddle electrode on the brainstem. Other examples of conditions and neural stimulators for addressing them can be found at www.neuromodulation.com/therapies, incorporated herein by reference.

The foregoing description is intended to illustrate various aspects of the instant technology. It is not intended that the examples presented herein limit the scope of the appended claims. The invention now being fully described, it will be apparent to one of ordinary skill in the art that many changes and modifications can be made thereto without departing from the scope of the appended claims.

The invention claimed is:

1. An apparatus, comprising:
a neural stimulator configured to generate electrical stimulation signals;
a flexible lead external to the neural stimulator including a lead distal end;
a first electrode arranged at the lead distal end and configured to deliver electrical stimulation signals to a first tissue area of a recipient of the apparatus;
a flexible lead extension including lead extension proximal end and a lead extension distal end;
a second electrode arranged at the lead extension distal end, wherein the second electrode is configured to be positioned at an apex of a cochlea of the recipient, or wherein the second electrode is configured to secure to one or more of a promontory, a round window or an area adjacent a cochleostomy of the recipient; and
a connector arranged at the lead extension proximal end configured to engage with the first electrode to secure the flexible lead extension to the first electrode,
wherein when the connector is engaged with the first electrode, the flexible lead extension provides an electrical path for the electrical stimulation signals from the first electrode through the flexible lead extension to the second electrode for delivery of the electrical stimulation signals to a second tissue area of the recipient.

2. The apparatus of claim 1, wherein the first electrode comprises a ball-shaped electrode.

3. The apparatus of claim 1, wherein the second electrode is configured to be attached to the apex via a screw, a pin, or a mesh.

4. The apparatus of claim 1, wherein the connector comprises an outer surface and an inner surface, wherein the inner surface comprises a conductor, and wherein the first electrode is configured to engage with the inner surface and form an electrical connection with the conductor.

5. The apparatus of claim 1, wherein the second electrode comprises a rod-shaped electrode.

6. A surgical kit comprising the apparatus of claim 1, and further comprising:
closed sterile packaging, wherein the neural stimulator is physically separate from the flexible lead, the first electrode, the flexible lead extension, the second electrode and the connector within the closed sterile packaging.

7. The surgical kit of claim 6, wherein the first electrode and the flexible lead are physically separate from the flexible lead extension, the second electrode and the connector in the closed sterile packaging.

8. The apparatus of claim 1, wherein the second electrode comprises a ball-shaped electrode.

9. The apparatus of claim 1, wherein the second electrode is configured to measure an Electrocochleography response.

10. The apparatus of claim 1, wherein the connector insulates the first electrode from the first tissue area when the connector is engaged with the first electrode such that the electrical stimulation signals are not delivered to the first tissue area when the connector is engaged with the first electrode.

11. An apparatus, comprising:
- a flexible lead extension comprising a lead extension proximal end and a lead extension distal end;
- a first electrode arranged at the lead extension distal end and configured to deliver electrical stimulation signals generated by a neural stimulator to tissue of a recipient of the neural stimulator; and
- a connector arranged at the lead extension proximal end configured to engage with a second electrode to secure the flexible lead extension to the second electrode and provide an electrical path for the electrical stimulation signals from an external flexible lead of a neural stimulator attached to the second electrode through the flexible lead extension and to the first electrode,
- wherein the second electrode is configured to be positioned at an apex of a cochlea of the recipient, or
- wherein the second electrode is configured to secure to one or more of a promontory, a round window or an area adjacent a cochleostomy of the recipient.

12. The apparatus of claim 11, wherein the connector is configured to engage with a ball-shaped electrode.

13. The apparatus of claim 11, wherein the first electrode is configured to be attached to the apex via a screw, a pin, or a mesh.

14. The apparatus of claim 11, wherein the connector comprises an outer surface and an inner surface; wherein the inner surface comprises a conductor, and wherein the inner surface is configured to engage with the second electrode and form an electrical connection between the conductor and the second electrode.

15. The apparatus of claim 11, wherein the first electrode comprises a rod-shaped electrode.

16. The apparatus of claim 11, further comprising the neural stimulator, the external flexible lead and the second electrode.

17. The apparatus of claim 11, wherein the first electrode is configured to measure an Electrocochleography response.

* * * * *